E. J. GOULD.
DIFFERENTIAL LOCK AND REVERSING MECHANISM.
APPLICATION FILED MAY 22, 1920.
1,350,276.
Patented Aug. 17, 1920.
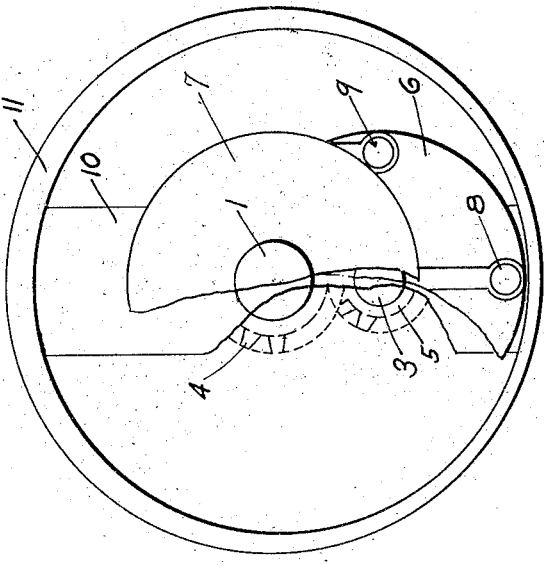
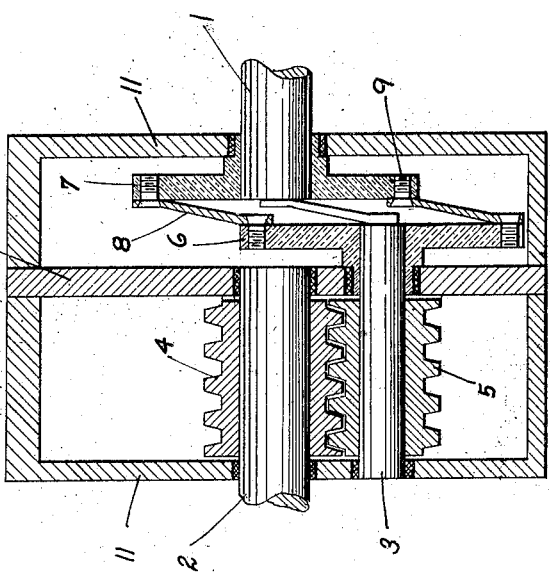
INVENTOR
Edwin J. Gould
BY
ATTORNEYS

UNITED STATES PATENT OFFICE.

EDWIN J. GOULD, OF OAKLAND, CALIFORNIA.

DIFFERENTIAL LOCK AND REVERSING MECHANISM.

1,350,276.  Specification of Letters Patent.  Patented Aug. 17, 1920.

Application filed May 22, 1920. Serial No. 383,512.

*To all whom it may concern:*

Be it known that I, EDWIN J. GOULD, a citizen of the United States, residing at Oakland, county of Alameda, State of California, have invented certain new and useful Improvements in Differential Locks and Reversing Mechanism.

My invention relates to improvements in differential lock and reversing mechanism in which two intermeshing toothed wheels operate in conjunction with two disk wheels secured together with connection rods for the purpose of operating two alined shaft sections, or, two live axle sections, and the objects of my improvements are, first, to provide a means to secure reverse action by means of toothed wheels; second, to transfer this reverse action to different sections of the line shafting by means of the rod connected disk wheels; and third, to reduce the amount of reversibility, or, of reversed power, transferred through the mechanism by end thrust secured from the use of spiral, or helical teeth.

I attain these objects by the mechanism illustrated in the accompanying drawing, in which—

Figure 1 is a sectional view of the entire mechanism; and Fig. 2 an elevation; similar numerals refer to similar parts in the two views. 1 and 2, are sections of an alined shaft; 3, is a counter-shaft; 4, is a toothed wheel keyed to the shaft section 2; 5, is a second toothed wheel keyed to the counter-shaft 3 and meshing with the wheel 4; 6, is a disk wheel keyed to the counter-shaft 3; and 7 is a second disk wheel connected by rods to disk wheel 6 and keyed to shaft section 1, 8, is one of the connection rods, and 9 indicates screw studs which secure the connection rods to the disk wheels 6 and 7; 10 is a traverse partition running through the casing to support the counter-shaft 3 and the end of the shaft section 2; 11, is the casing inclosing the whole mechanism. In operation the casing 11 rotates with both shaft sections and is the driving member in the case of a live axle as used for automobiles. In acting as a reverse gear the motion is reversed in being transferred from the toothed wheel 4 to the toothed wheel 5, and the disk wheel 6 is turned in the same direction as the toothed wheel 5 by the counter-shaft 3, and the wheel 6 in turn transmits motion in the same direction it is turning to wheel 7 by means of the connection rods 8. The connection rods are preferably four in number, each of the connection rods having one end attached to wheel 6 and the other end to wheel 7 at an equal distance from the centers of wheels 6 and 7 and operate by alternately pushing and pulling to rotate the wheels 6 and 7 always in the same direction and at the same speed, and without any lost motion or backlash, and the shaft sections 1 and 2 are thus rotated in opposite directions. It will be plain that the reverse speed in this mechanism could be regulated by changing the relative size of the two toothed wheels and that if these were of like size the speed would be equal. In certain rotatable positions of the disk wheels two of the connection rods (when four are used) are neutral for transmitting power they being alined at this time with each other and with the shafts, but when this occurs the pair of connection rods on opposite quarters of the disk wheels are in position to transmit power at maximum efficiency, and when accurately placed at equal distances in the radius of each disk wheel have but small resistance resulting from friction, and put very slight side strain on the bearings of the shafts. When the mechanism is used as a differential lock the teeth of wheels 4 and 5 are placed at a sufficient spiral angle to cause all of the power applied to one shaft section to be transferred to the other shaft section directly as in a solid axle and stop all reverse motion by the resulting end thrust caused by the spiral gears 6 and 7 until a separate force is applied to the opposite shaft section which relieves the end thrust and allows the shaft sections to revolve in opposite directions, which latter action takes place with an automobile axle in turning the car, and it is designated as a lock for it will drive from the casing 11 with one wheel off of the ground by the end thrust of the spiral teeth and still allow the free wheel to be turned by a power applied direct to this free wheel. A sufficiently acute angle to cause locking as described is at all times the preferred construction for motor car use, while for reversing power, only a slight degree of angle is needed to cause the mechanism to be noiseless, and to run without jar or vibration.

Various modification in detail, such, for instance as the replacing of the two disk wheels by sectional wheels, or cutaway disk wheels, or using a different number of connection rods, may be resorted to without departing from the spirit of the invention, and I reserve the right to make such changes and modification as come properly within the protection prayed.

I claim—

1. The combination in a reversing mechanism, of two intermeshing toothed wheels, two disk wheels operating in conjunction with said toothed wheels, pivoted connection rods securing said disk wheels each to the other, to impart a reverse action from one of said toothed wheel to one of said disk wheels and from thence to the other of said disk wheels substantially as set forth.

2. In a reversing mechanism, the combination of two alined shaft sections, a toothed wheel mounted on one of said shaft sections, a disk wheel mounted on the opposite of said shaft sections, a counter-shaft a second toothed wheel fixedly mounted on said counter-shaft and meshing with said first named toothed wheel, a second disk wheel fixedly mounted on said counter-shaft, a number of connection rods having their ends pivotally secured in the radius of said first and second named disk wheels for the purpose of transmitting reverse motion produced by the oppositely revolving intermeshing toothed gears, from one shaft section to the other shaft section, all substantially as described.

3. In a reversing mechanism, the combination of a casing, two nearly abutting alined shaft sections ending in said casing, a traverse partition in said casing supporting the end of one of the said shaft sections, a counter-shaft supported by said casing and traverse partition, a toothed wheel solidly mounted on said counter-shaft, a disk wheel also solidly mounted on said counter-shaft, a second toothed wheel mounted on one of said shaft sections and intermeshing with the toothed wheel on said counter-shaft, a disk wheel mounted on the opposite alined shaft section, a number of connection rods pivotally secured to said last named disk wheel and likewise secured to said first named disk wheel the whole operating to reverse the motion of one shaft section when the motion is transmitted to the other shaft section where two shaft sections are alined.

4. In a differential lock, the combination of a suitable casing for being rotatably driven, a traverse central section in said casing, a counter-shaft supported in and by said casing and traverse section, a live axle entering said casing having its end supported by said traverse central casing section, a second live axle section entering opposite side of said casing and alined with first named axle section, a wheel with acutely angled spiral gear teeth mounted on said first named axle section, a second toothed wheel with similarly angled but oppositely directed teeth mounted on said counter-shaft and meshing with first named toothed wheel, a disk wheel also mounted on said counter-shaft, a second disk wheel mounted on second named axle section, a number of connection rods having each of their ends pivotally secured in the radius of said first and second named disk wheels, the whole adapted to be driven in a rotary direction from the casing, and to allow a difference in speed of the two axle sections to occur when separate forces tend to accelerate one axle section and at the same time retard the opposite axle section.

In testimony that I claim the foregoing, I have hereunto set my hand in the presence of two witnesses, this 15 day of May, 1920.

EDWIN J. GOULD.

Witnesses:
 EDMUND BOW,
 IRIS WALKER.